United States Patent
Xie

(10) Patent No.: US 9,329,439 B2
(45) Date of Patent: May 3, 2016

(54) LIQUID CRYSTAL DRIP IRRIGATION DEVICE

(71) Applicant: SHENZHEN CHINA STAR OPTOELECTRONICS TECHNOLOGY CO., LTD., Shenzhen, Guangdong (CN)

(72) Inventor: Kecheng Xie, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 312 days.

(21) Appl. No.: 14/235,461

(22) PCT Filed: Nov. 15, 2013

(86) PCT No.: PCT/CN2013/087216
§ 371 (c)(1),
(2) Date: Jan. 28, 2014

(87) PCT Pub. No.: WO2015/021701
PCT Pub. Date: Feb. 19, 2015

(65) Prior Publication Data
US 2015/0248029 A1 Sep. 3, 2015

(30) Foreign Application Priority Data
Aug. 14, 2013 (CN) .......................... 2013 1 0353858

(51) Int. Cl.
*B05B 7/06* (2006.01)
*G02F 1/1341* (2006.01)
*G02F 1/13* (2006.01)
*B05C 5/02* (2006.01)
*B05C 11/10* (2006.01)

(52) U.S. Cl.
CPC ............ *G02F 1/1341* (2013.01); *B05C 5/0225* (2013.01); *G02F 1/1303* (2013.01); *B05C 5/027* (2013.01); *B05C 5/0229* (2013.01); *B05C 11/1034* (2013.01); *G02F 2001/13415* (2013.01)

(58) Field of Classification Search
CPC ................. G02F 1/1303; G02F 1/1341; G02F 2001/13415; B05C 11/1034; B05C 5/0225; B05C 5/0229
USPC .......................................... 118/300, 313, 315
See application file for complete search history.

(56) References Cited

U.S. PATENT DOCUMENTS

2005/0061238 A1* 3/2005 Sakurada .............. G02F 1/1341
118/300

* cited by examiner

*Primary Examiner* — Jason K Niesz

(57) ABSTRACT

The present invention relates to a liquid crystal drip irrigation device, comprising a duct container, in which a plurality of liquid crystal ducts are arranged. The liquid crystal ducts pass through the duct container from top end surface to bottom end surface of the duct container. A baffle is appressed to the bottom end surface of the duct container. A plurality of through holes corresponding to the liquid crystal ducts in positions are formed on the baffle. The bottom end surface of the duct container is provided with a first actuator and the baffle is provided with a second actuator. The first actuator and the second actuator drive the baffle to move relative to the duct container.

10 Claims, 1 Drawing Sheet

LIQUID CRYSTAL DRIP IRRIGATION DEVICE

FIELD OF THE INVENTION

The present invention relates to a manufacturing technology of a liquid crystal display panel, and more particularly to a liquid crystal drip irrigation device.

BACKGROUND OF THE INVENTION

In the manufacturing process of a liquid crystal display panel, the liquid crystal is dripped onto a glass substrate that is around with seal agent, and then a top substrate and a bottom substrate are combined to form the liquid crystal display panel. At present, a single head of a liquid crystal drip irrigation device is employed to drip the liquid crystal onto a single cell. In such case, it is possible to take a long time for dripping the liquid crystal onto the substrate and it causes a low accuracy of drip irrigation. Moreover, the dripping amount of liquid crystal at each once is different from each other, which would cause a quality difference among the same batch of the products. It is not beneficial to a mass production of the products.

SUMMARY OF THE INVENTION

Aiming at the drawback that a mass and high accuracy production of liquid crystal display panels cannot be achieved by the liquid crystal drip irrigation way in the prior art, a liquid crystal drip irrigation device is proposed in the present invention to solve the above problem.

The present invention adopts the following technical solution to solve its technical problem: a liquid crystal drip irrigation device is provided, comprising a duct container, in which a plurality of liquid crystal ducts are arranged. The liquid crystal ducts pass through the duct container from top end surface to bottom end surface of the duct container. A baffle is appressed to the bottom end surface of the duct container. A plurality of through holes corresponding to the liquid crystal ducts in positions are formed on the baffle. The bottom end surface of the duct container is provided with a first actuator and the baffle is provided with a second actuator. The first actuator and the second actuator drive the baffle to move relative to the duct container.

The liquid crystal drip irrigation device according to the present invention, wherein the first actuator comprises a first magnetic coil and the second actuator comprises a second magnetic coil. The first magnetic coil and the second magnetic coil wind in the same direction and have the same number of turns.

The liquid crystal drip irrigation device according to the present invention, wherein the second magnetic coil winds around edge of the baffle.

The liquid crystal drip irrigation device according to the present invention, wherein the first actuator is magnet and the second actuator is magnetic coil.

The liquid crystal drip irrigation device according to the present invention, wherein the diameter of opening of the liquid crystal duct located on the bottom end surface of the duct container ranges from 0.1 mm to 4 mm.

The liquid crystal drip irrigation device according to the present invention, wherein the baffle is made of ceramic material.

The liquid crystal drip irrigation device according to the present invention, wherein the liquid crystal drip irrigation device further comprises a liquid crystal container which is arranged above the duct container and communicates with the liquid crystal ducts. A liquid crystal inlet for filling the liquid crystal and a gas inlet for injecting pressurized gas are formed on the liquid crystal container.

The liquid crystal drip irrigation device according to the present invention, wherein the pressurized gas is nitrogen gas.

The liquid crystal drip irrigation device according to the present invention, wherein the liquid crystal container is of inverted truncated cone shape, of which the area of the upper surface is larger than that of the lower surface.

The liquid crystal drip irrigation device according to the present invention further comprises a support. The support is connected to the duct container permanently for moving the duct container.

When implementing the liquid crystal drip irrigation device of the present invention, the liquid crystal can be dripped onto a plurality of cells, which can improve the production efficiency greatly, reduce the manufacturing cost and promote the competitiveness of the products. Since the amount of liquid crystal drip irrigation in all of the liquid crystal ducts can be adjusted by the movement of the baffle, all the liquid crystal ducts have the same drip irrigation amount, and quality of all the products are the same. The baffle is actuated by the electromagnetism, so that the amount of liquid crystal dripping can be controlled accurately to complete the liquid crystal dripping work, and the conformity rate can be improved.

BRIEF DESCRIPTIONS OF THE DRAWINGS

The present invention will further be explained with reference to drawings. In the drawings.

DETAILED DESCRIPTION OF THE EMBODIMENTS

The present invention will be explained in detail with reference to drawings and examples.

Figure 1:
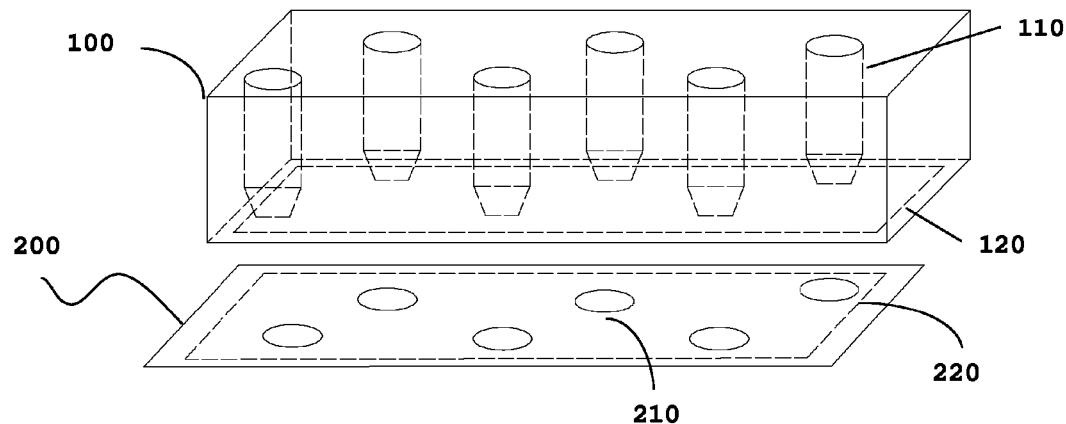
FIG. 1 is a structural diagram of a liquid crystal drip irrigation device according to a preferred embodiment of the present invention.

FIG. 1 shows a structural diagram of a liquid crystal drip irrigation device according to the present invention. The liquid crystal drip irrigation device comprises two parts: a duct container 100 and a baffle 200, which are appressed to each other. The baffle 200 is appressed to a bottom end surface of the duct container 100. A plurality of liquid crystal ducts 110 with the same size are received in the duct container 100. All of the liquid crystal ducts 110 can communicate with a liquid crystal container configured for receiving the liquid crystal, and can guide the liquid crystal out of the liquid crystal container and drip the liquid crystal down from openings of the liquid crystal ducts 110. All of the liquid crystal ducts 110 are arranged uniformly in the duct container 100, and pass through the duct container 100 from top end surface to bottom end surface of the liquid crystal container 100 in vertical direction. Generally, the lower part of the liquid crystal duct 110 may be taper for controlling the shape of a drop of the liquid crystal. In view of the size of the product, the diameter of opening of the liquid crystal ducts 110 located at the lower part ranges from 0.1 mm to 4 mm.

A plurality of through holes 210 corresponding to the liquid crystal ducts 110 in positions are formed on the baffle 200. Preferably, the shape and size of the through hole 210 match with the opening at the lower part of the liquid crystal ducts 110. When each through hole 210 of the baffle 200 is aligned with the liquid crystal duct 110, the liquid crystal can be dripped out through the liquid crystal duct 110. However, when the baffle 200 and the liquid crystal ducts 110 are offset relative to each other, the liquid crystal can not be dripped out as the liquid crystal ducts 110 are blocked by the baffle 200. The amount of dropped out liquid crystal can be controlled accurately by controlling the baffle 200 to change its position in a limited time.

In order to control the position of the baffle 200 accurately, a first magnetic coil 120 is embedded in the duct container 100 as a first actuator, and a second magnetic coil 220 is embedded in the baffle 200 as a second actuator. The two magnetic coils wind in the same direction and have the same number of turns. The two coils provide a positive magnetic field and a negative magnetic respectively while the two coils are energized, in which case the through holes of the baffle 200 are aligned with the openings of all of the liquid crystal ducts 110; otherwise, the through holes of the baffle 200 and the openings of all of the liquid crystal ducts 110 are offset relative to each other. Therefore, the position of the baffle 200 can be changed by switching the electrical signal passed through the coils, and the moving frequency of the baffle 200 is consistent with the frequency of switching the electrical signal. If the moving frequency of the baffle 200 is higher, the smaller amount of liquid crystal drop could be attained; otherwise, the bigger amount of liquid crystal drop could be attained. In such case, the amount of liquid crystal drop can be controlled accurately. In practice, a constant electrical signal is fed into one of the two coils to produce a fixed magnetic field, and then change the electronic signal fed into another magnetic coil to change the relative position of the baffle 200.

In the present embodiment, the magnetic coils are served as actuators to drive the baffle 200 to move. Other means can be adopted, for example, the duct container 100 can be provided with a magnet and the baffle 200 is provided with a magnetic coil for driving the baffle 200 to move, i.e. the first actuator can be a magnet or electronic magnet, and the second actuator may be a magnetic coil.

In view of the shape of the baffle 200, the second magnetic coil 220 winds around the edge of the baffle 200, so that the magnetic coil can be easily mounted. It should be considered that the accuracy of the position of the baffle 200 might be affected by the friction between the baffle 200 and the liquid crystal ducts 110 while the baffle 200 is mounted. Therefore, the baffle 200 can be made of ceramic material, which can produce a little friction.

Figure 2:
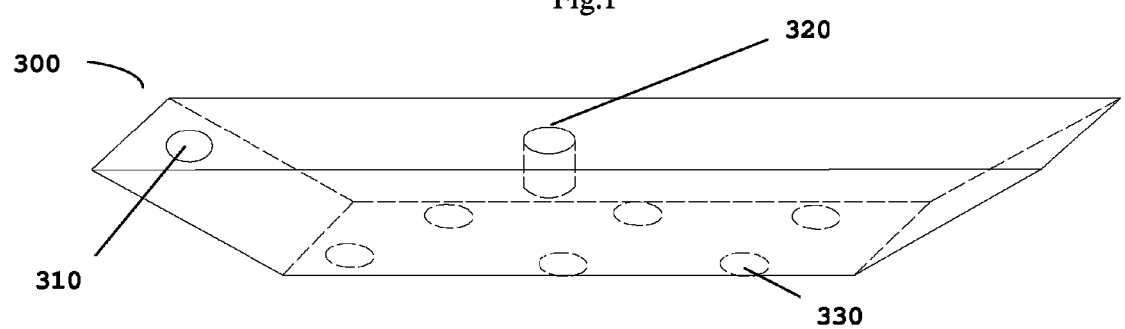
FIG. 2 is a structural diagram of a liquid crystal container of the liquid crystal drip irrigation device as shown in FIG. 1.

In order to control the amount of liquid crystal drop more accurately, a liquid crystal container 300 as shown in FIG. 2 is arranged above the duct container 100. The inner of the liquid crystal container 300 defines a cavity for receiving the liquid crystal. Openings 330 are formed on the bottom of the cavity, which communicate with the liquid crystal ducts 110. The liquid crystal received in the cavity flows into the liquid crystal ducts 110 via the openings 330. A liquid crystal inlet 320 for filling the liquid crystal is formed on the top of the liquid crystal container 300. The liquid crystal to be dripped can be supplied through the liquid crystal inlet 320. A gas inlet 310 for injecting pressurized gas is also formed on top of the liquid crystal container 300. Generally, the pressurized gas is nitrogen gas. The nitrogen gas is injected into the gas inlet 310 to adjust the pressure in the liquid crystal container 300 so that the dripping rate of the liquid crystal and the amount of liquid crystal drop can be adjusted.

Preferably, as shown in FIG. 2, the liquid crystal container 300 may be of inverted truncated cone shape, of which the area of the upper surface is larger than that of the lower surface. With such structure, the liquid crystal received in the liquid crystal container 300 can flow out smoothly via the opening 330.

Figure 3:
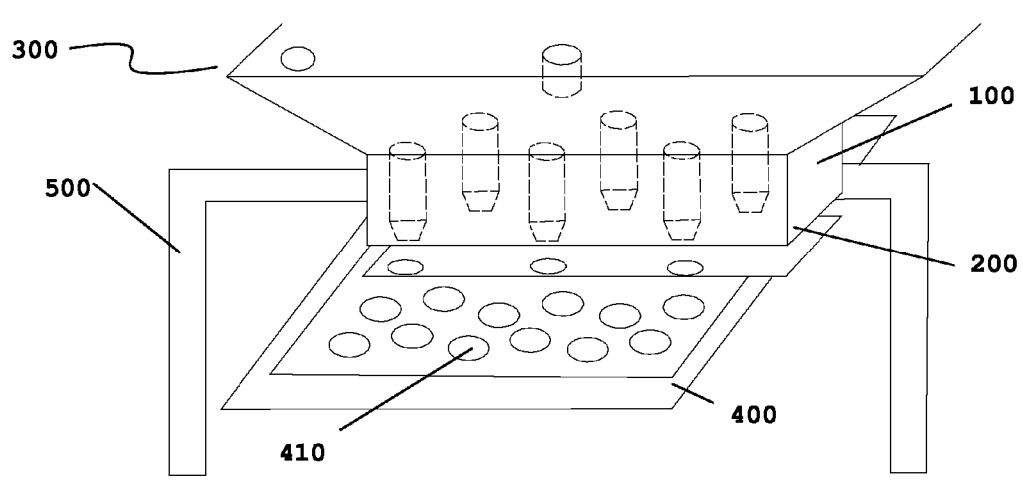
FIG. 3 is structural diagram of a production line equipped with the liquid crystal drip irrigation device as shown in FIG. 1.

FIG. 3 shows a production line equipped with such liquid crystal drip irrigation device. The duct container 100 is supported by a support 500 and arranged above the production line. When the glass substrate 400 to be filled moves to a right position, the support 500 move the duct container 100 downward to a right height. Then, the position of the duct container 100 is fine tuned. When the liquid crystal ducts 110 are aligned with the filling portions 410 of the glass substrate 400, the liquid crystal is dripped onto the glass substrate 400.

In filling process, the electrical signals for controlling are fed into the first magnetic coils 120 and the second magnetic coils 220 respectively so that the baffle 200 moves relative to the duct container 100 in horizontal direction. When a bigger amount of liquid crystal drop is required, the moving frequency of the baffle 200 can be lower; when a smaller amount of liquid crystal drop is required, the moving frequency of the baffle 200 can be higher. Moreover, the amount of liquid crystal drop can be controlled by controlling the amount of the nitrogen gas injected into the gas inlet. When bigger drop of the liquid crystal is required, the amount of the nitrogen gas should be more so that the pressure in the liquid crystal container becomes higher; otherwise, the pressure in the liquid crystal container becomes lower.

After the drip irrigation of one glass substrate is completed, the next glass substrate is moved to the proper position by the production line for further drip irrigation. When all of the drip irrigation of the substrates have been completed, each part can be detached for cleaning and being on standby.

All the above are only the preferred examples of the present invention, and do not limit the present invention. Any amendments, equivalent replacements, improvements, etc. within the spirit and principle of the present invention shall fall within the scope of the claims of the present invention. Various changes may be made and equivalents may be substituted without departing from the scope of the present invention.

The invention claimed is:

1. A liquid crystal drip irrigation device, comprising: a duct container in which a plurality of liquid crystal ducts for dripping liquid crystal are arranged, wherein the liquid crystal ducts pass through the duct container from top end surface to bottom end surface of the duct container; a baffle is appressed to the bottom end surface of the duct container; a plurality of through holes corresponding to the liquid crystal ducts in positions are formed on the baffle, the bottom end surface of the duct container is provided with a first actuator and the baffle is provided with a second actuator; and the first actuator and the second actuator drive the baffle to move relative to the duct container.

2. The liquid crystal drip irrigation device according to claim 1, wherein the first actuator comprises a first magnetic coil and the second actuator comprises a second magnetic coil; the first magnetic coil and the second magnetic coil wind in the same direction and have the same number of turns.

3. The liquid crystal drip irrigation device according to claim 2, wherein the second magnetic coil winds around edge of the baffle.

4. The liquid crystal drip irrigation device according to claim 1, wherein the first actuator is a magnet and the second actuator is a magnetic coil.

5. The liquid crystal drip irrigation device according to claim 1, wherein a diameter of opening of the liquid crystal duct located on the bottom end surface of the duct container ranges from 0.1 mm to 4 mm.

6. The liquid crystal drip irrigation device according to claim 1, wherein the baffle is made of ceramic material.

7. The liquid crystal drip irrigation device according to claim 1, wherein the liquid crystal drip irrigation device further comprises a liquid crystal container which is arranged above the duct container and communicates with the liquid crystal ducts, and a liquid crystal inlet for filling the liquid crystal and a gas inlet for injecting pressurized gas are formed on the liquid crystal container.

8. The liquid crystal drip irrigation device according to claim 7, wherein the pressurized gas is nitrogen gas.

9. The liquid crystal drip irrigation device according to claim 7, wherein the liquid crystal container is of inverted truncated cone shape, of which the area of the upper surface is larger than that of the lower surface.

10. The liquid crystal drip irrigation device according to claim 1, wherein the liquid crystal drip irrigation device further comprises a support, the support is connected to the duct container permanently for moving the duct container.

\* \* \* \* \*